Patented Jan. 25, 1938

2,106,447

UNITED STATES PATENT OFFICE 2,106,447

PIGMENTED COMPOSITION

George Barsky, New York, N. Y., and Gustave Klinkenstein, Maplewood, and Charles Rohleder, Newark, N. J., and Clarence F. Silleck, Brooklyn, N. Y., assignors to C. J. Osborne Co., New York, N. Y., a corporation of New York, and Maas & Waldstein Co., Newark, N. J., a corporation of New Jersey No Drawing. Application June 5, 1936, Serial No. 83,696

10 Claims. (Cl. 134—79)

This invention relates to a composition containing pigment and adapted for use in lacquers and the like. More particularly, the composition of the present invention includes carbon black or similar substances as a pigmenting agent in a composition containing a cellulose ester.

In general, compositions of this character have been well known and have been used in the art for a considerable time. It is desirable to provide a composition in which there is a carbon black and a cellulose ester formed either as a paste or in chips or flakes and intended to be added to a lacquer composition, usually also containing cellulose esters. The pigmented composition constitutes a concentrated form of the pigment which may be readily added to the lacquer and be quickly and uniformly blended therewith.

It was found that in making compositions of this character by working the ingredients on rolls, the carbon black became dispersed throughout the mass of the composition and provided a marketable product. However, it required a considerable time to effect the result and it was not possible to obtain a high color black.

It has been proposed to provide a composition of carbon black by the use of black dyes of such character as to be soluble in the medium carrying the carbon black, whereby the dye acts as a dispersing agent and also acts as a coloring agent to increase the deep color of the composition. However, such dyes are, in general, relatively expensive and probably the degree of blackness of the product is due not to the dispersing action of the dye, but at least in part to the color which is uniformly distributed throughout the lacquer. Such dyes are not permanent in that on exposure to atmospheric conditions, are not fast to light, and reactions may take place which change the same and the color may therefore become of lesser intensity.

The present invention is intended to overcome the disadvantages of the prior art and to provide a composition containing carbon black with a substance which acts as a dispersing agent and a stabilizer in the composition, in which there is no danger of discoloration of the lacquer or of the coating made therewith upon exposure to atmospheric conditions. The chemical compounds of the present invention are sufficiently stable so that the effectiveness thereof remains even upon long standing of the pigmented composition or of the lacquer made therefrom.

We contemplate the use of compounds of the aromatic amino type and more particularly such compounds as have two amino groups, each of said groups being present on a different aromatic radical, or said groups may be on a single aromatic radical. While these compounds in themselves may be effective for the desired purpose, preferably they are used in the form of compounds thereof with an organic acid. While various organic acids are suitable for the purpose, we prefer generally to use the fatty acids having from 8 to 18 carbon atoms and which are ordinarily termed the "higher" fatty acids. Among the amino compounds which may be used in the present invention are those in which there are two aromatic radicals, either directly linked together through the carbon atoms of the rings or which may be linked by means of the carbon atoms of an aliphatic radical, such as hydrocarbon or a substituted hydrocarbon radical. The amino compounds should be soluble in at least one of the ingredients of the composition.

Among the substances available for the desired purpose are compounds having the following structural formula:

This represents the type of compound in which there is a direct linkage between the aromatic radicals. In this general formula the X represents hydrogen or a hydrocarbon radical. In other words, the aromatic nucleus may be a phenyl group or a tolyl or higher homolog thereof. The amino groups on the aromatic radicals are shown in the para position, but obviously they may be in any other positions on the rings.

Other compounds coming within the scope of the present invention may be represented by the following general formula:

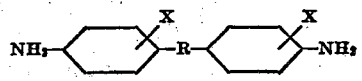

In this case, the general structure of the compound is similar to the structure in accordance with the general formula given above with the difference that the aliphatic radical R is interposed between the aromatic radicals and R represents a hydrocarbon group. The linkage between the rings is therefore through a carbon atom.

A number of specific compounds have been found entirely suitable for the present purpose as, for example, benzidine, various tolidines, and aromatic substituted aliphatic hydrocarbons, as for example, di-amino di-phenyl methane. Such compounds have been combined with various organic acids such as myristic, stearic, oleic, lauric, or mixtures containing the same, as for example, a mixture of lauric and myristic acids as well as mixtures containing caproic, capric and caprilic acids.

In order to form the desired compounds, we take equal amounts of the amino compounds and the acid, as for example, ortho-tolidine and oleic acid, and heat the same at a temperature of approximately 300° F. for about one hour, or until the reaction is completed and from an inspection of the resulting product it is homogeneous and clear. The amount of oleic acid is approximately equal to the amount of the tolidine, and there is formed a compound of oleic acid with tolidine. However, the present invention contemplates also the use of larger quantities of either constituent.

Compositions made in accordance with the present invention are generally formed with various ingredients in accordance with the following proportions:

| | Parts by weight |
|---|---|
| Nitrocellulose (½ sec.) | 18.0 |
| Dibutyl phthalate | 3.5 |
| Dispersing agent | 1.0 |
| Carbon black | 3.5 |
| Solvents | 5.0 |

There is generally present a small amount of dispersing agent, usually from 1 to 5 per cent thereof in the composition. When different carbon blacks are used or when the viscosity of the nitrocellulose is different, or the proportions of the ingredients are changed, the amount of dispersing agent for optimum results is obtained by trial.

As a plasticizer, dibutyl phthalate is used but this is not at all essential and various other plasticizers or mixtures of other plasticizers with the phthalate may be used in place thereof. The solvents used usually constitute a mixture of toluol, ethyl alcohol and ethyl acetate. In most cases, only toluol and the ethyl alcohol will be necessary, but if the viscosity of the nitro-cellulose is somewhat high, ethyl acetate may be added in order to render the mixture sufficiently plastic or fluid. The usual procedure in forming the compositions is to dissolve the dispersing agents in the solvents and then mix the same in a suitable mixer with the other ingredients to give a plastic and uniform mass. The mass then may be subjected to the action of rolls or calenders in order to form sheets of the composition, which are then dried and broken up to form chips or flakes. If desired, the chips may be dissolved in suitable solvents and be sold to the trade in the form of a paste.

In the use of this composition, a sufficient amount of the paste or chips is added to the ingredients of a lacquer and the mixture is tumbled or otherwise mixed in suitable apparatus until the ingredients have all blended and the mixture is homogeneous. This provides a uniform and permanent dispersion of the carbon black in the lacquer without any danger of seeding or reagglomeration of the pigment or of deterioration of the dispersing agent on long storage.

We are aware that it has been proposed to provide compositions of this general character by the use of certain dyes or coloring matters of a type containing nitrogen. Some dyes are azo colors and others are basic dyestuffs. These compounds are quite different from those used herein and they are of such complicated structure and large molecular weight as to be readily affected by various chemical agents and therefore they are very likely to deteriorate in use. Furthermore, such compounds are not as effective in obtaining the desired result as those compounds claimed herein.

We are also aware that it has been proposed to make a mixture of carbon black with the disubstituted guanidines. The carbon black was merely mixed with a small amount of the guanidine and the dry mixture, which was in the powdered state, was intended to be ground into the lacquer composition. The grinding of a high color carbon black in the lacquer composition is difficult, and grinding does not give a good dispersion. Also, the intensity of the black is injured by the prolonged working which is necessary for dispersion.

Although we have described the invention setting forth a few examples of the operation thereof, it is to be understood that the present invention is not limited to the details described herein. For instance, the composition of the plastic mass may be changed to a large extent within the scope of the present invention. Instead of low viscosity nitrocellulose, other forms of nitrocellulose may be used or other cellulose esters may be substituted for the same. It is possible to add to the composition various synthetic resins adapted for lacquer or varnish purposes and one may replace at least in part the cellulose ester by such resins. Other pigments may be used in conjunction with the carbon black. The proportions of the amino compound and the fatty acid may be varied to a large extent and the method whereby the reaction between the two is caused to take place may also be changed at will. Other amino compounds, of the type of

and its homologs may be used. Various other acids than those named herein may also be used, as, for example, benzoic acid, abietic acid and others. These and other changes may be made in the details set forth above within the spirit of the invention, the scope of which is defined in the claims appended hereto.

What we claim is:—

1. A pigmented composition for lacquers and the like comprising carbon black, a cellulose ester and an aromatic di-amino compound, the amino groups being linked to different carbon atoms, the quantity of said di-amino compound present being sufficient to act as a dispersing agent and as a stabilizer for the dispersion of carbon black.

2. A pigmented composition for lacquers and the like comprising carbon black, a cellulose ester and an aromatic di-amino compound in the form of a compound thereof with an organic acid, the amino groups being linked to different carbon atoms, the quantity of said di-amino compound present being sufficient to act as a dispersing agent and as a stabilizer for the dispersion of carbon black.

3. A pigmented composition for lacquers and the like comprising carbon black, a cellulose ester and an aromatic di-amino compound in the form of a compound thereof with an organic acid taken from the class of the higher fatty acids having from 8 to 18 carbon atoms, the amino groups being linked to different carbon atoms, the quantity of said di-amino compound present being sufficient to act as a dispersing agent and as a stabilizer for the dispersion of carbon black.

4. A pigmented composition for lacquers and the like comprising carbon black, a cellulose ester and an aromatic di-amino compound in which each of the amino groups is located on a different aromatic nucleus, the quantity of said di-amino compound present being sufficient to act as a dispersing agent and as a stabilizer for the dispersion of carbon black.

5. A pigmented composition for lacquers and the like comprising carbon black, a cellulose ester and an aromatic di-amino compound in which each of the amino groups is located on a different aromatic nucleus and the said nuclei are directly joined together, the quantity of said di-amino compound present being sufficient to act as a dispersing agent and as a stabilizer for the dispersion of carbon black.

6. A pigmented composition for lacquers and the like comprising carbon black, a cellulose ester and an aromatic di-amino compound having the following general formula:

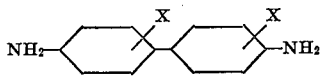

wherein X is a radical taken from the class consisting of hydrogen and hydrocarbon, the quantity of said di-amino compound present being sufficient to act as a dispersing agent and as a stabilizer for the dispersion of carbon black.

7. A pigmented composition for lacquers and the like comprising carbon black, a cellulose ester and an aromatic di-amino compound having the following general formula:

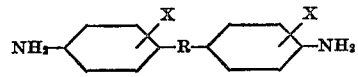

wherein X is a radical taken from the class consisting of hydrogen and hydrocarbon and R is a hydrocarbon radical, the quantity of said di-amino compound present being sufficient to act as a dispersing agent and as a stabilizer for the dispersion of carbon black.

8. A pigmented composition for lacquers and the like comprising carbon black, a cellulose ester and the oleic acid compound of benzidine as a dispersing and stabilizing agent.

9. A pigmented composition for lacquers and the like comprising carbon black, a cellulose ester and the oleic acid compound of tolidine as a dispersing and stabilizing agent.

10. A pigmented composition for lacquers and the like comprising carbon black, a cellulose ester and the oleic acid compound of diamino diphenyl methane as a dispersing and stabilizing agent.

GEORGE BARSKY.
GUSTAVE KLINKENSTEIN.
CHARLES ROHLEDER.
CLARENCE F. SILLECK.